Nov. 2, 1937.  F. R. HENSEL ET AL  2,097,816
WELDING ELECTRODE
Filed June 16, 1936
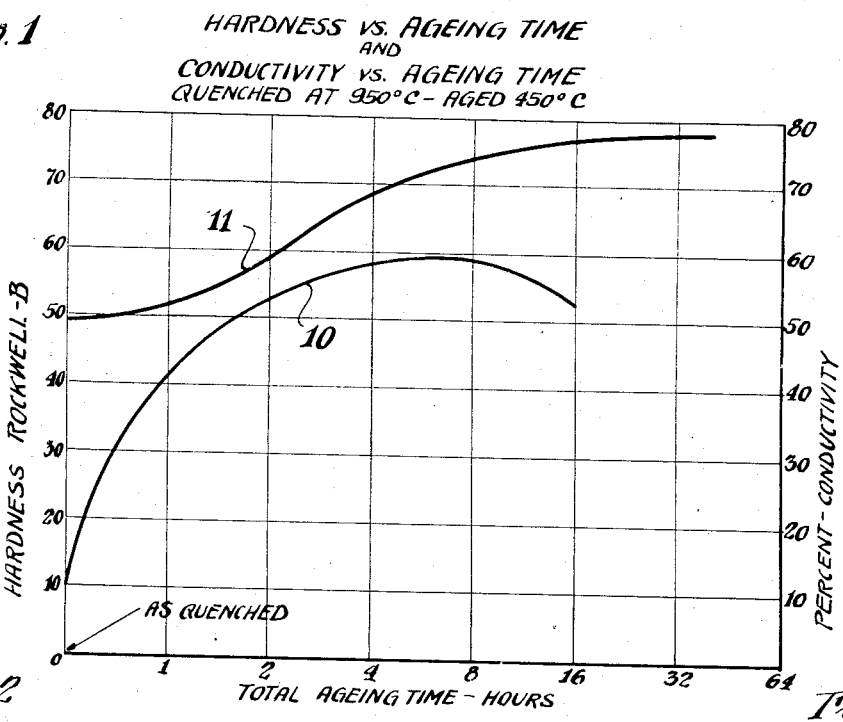
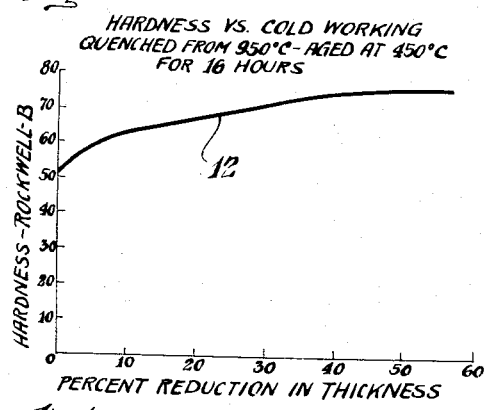
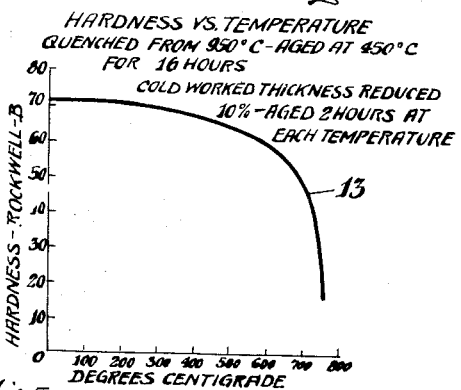
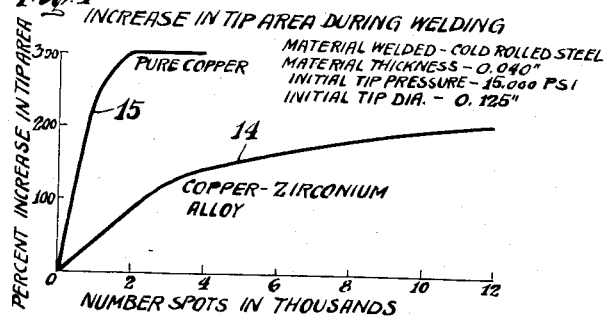
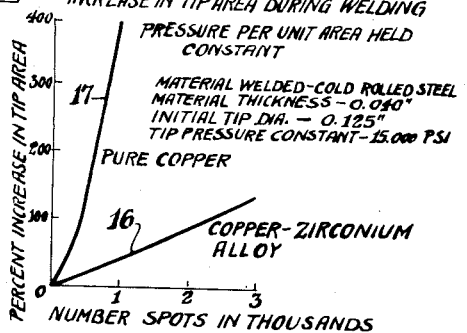
INVENTORS
Franz R. Hensel
BY Earl I. Larsen
ATTORNEY Patented Nov. 2, 1937

2,097,816

UNITED STATES PATENT OFFICE 2,097,816

WELDING ELECTRODE

Franz R. Hensel and Earl I. Larsen, Indianapolis, Ind., assignors to P. R. Mallory & Co., Inc., Indianapolis, Ind., a corporation of Delaware Application June 16, 1936, Serial No. 85,451

1 Claim. (Cl. 219—4)

This invention relates to welding electrodes and more particularly to pressure exerting welding electrodes.

An object of the invention is to produce an improved pressure exerting welding electrode.

Other objects of the invention will be apparent from the following description taken in connection with the appended claim.

The present invention comprises the combination of elements, methods of manufacture, and the product thereof brought out and exemplified in the disclosure hereinafter set forth, the scope of the invention being indicated in the appended claim.

While a preferred embodiment of the invention is described herein, it is contemplated that considerable variation may be made in the method of procedure and the combination of elements without departing from the spirit of the invention.

In the resistance welding of metal parts the usual procedure is to pass an electric current through the parts to produce a local heating effect which results in the welding of the parts together. The current and pressure are usually applied by welding electrodes which are firmly pressed against the parts to be welded and which conduct the electric current to the welding area. Briefly, this is the procedure followed in all forms of resistance welding such as spot welding, seam welding, projection welding and the like.

Since the welding electrodes must conduct electric current and since heating is not generally desired except at the point where welding is to take place, it is desirable that the welding electrodes be of high electrical conductivity. Due to the heating which necessarily takes place at the point of welding, another requirement of a good welding electrode is that it shall be heat resistant, in other words that it shall not soften materially or change its electrical conductivity or other desirable properties at the temperatures developed during welding. It is particularly desirable that the electrodes shall not be softened sufficiently by the heat developed to be deformed by the pressure exerted in the welding operation. Where welding electrodes have been made of pure copper or of certain copper alloys in the past, deleterious mushrooming of the electrodes has frequently taken place resulting in an early destruction of the electrodes thereby requiring replacement.

Another obvious requirement for good welding electrodes is that the surface shall not become oxidized or corroded to any substantial extent during use. Corrosion and oxidation normally result in the development of a high resistance layer on the surface which prevents good electrical contact with the parts to be welded.

Substantially the same requirements must be met by electrodes used in electric riveting machines and these may be considered to be one form of resistance welding electrodes.

Figure 1 is a graph showing the increase in hardness and the increase in conductivity of an electrode embodying the present invention during age hardening;

Figure 2 is a graph showing the increase in hardness with cold working;

Figure 3 is a graph showing the heat resistance of the material; and

Figures 4 and 5 show the comparative life of a welding electrode made according to the present invention and one made of pure copper.

According to the present invention the electrodes are made of alloys of copper containing zirconium. The preferred composition of the electrodes may be as follows:

| | |
|---|---|
| Zirconium | 0.1% to 5% |
| Copper | Balance |

Other elements which may be included in the alloy, up to a few percent, are cadmium, zinc, silicon and beryllium.

The electrode alloy may be made according to standard alloying procedures. For example, the zirconium can be added to molten copper in the form of a copper zirconium hardener alloy containing 15–30% zirconium.

An important advantage of the electrodes disclosed herein are their susceptibility to age-hardening. By giving the electrode alloy the following treatment it is possible to materially improve its characteristics: After the alloy has been made it may preferably be heated to a temperature somewhat above 700° C. and preferably in the order of 800° C. to 1000° C. It is then rapidly cooled from this high temperature preferably by quenching in water. The alloy is then given an age-hardening treatment or baking at a temperature below 700° C. and preferably in the range of 400° C. to 600° C.

It has been found that the above treatment increases the hardness of the electrode by a material extent. In Figure 1, curve 10 represents the increase in hardness of an electrode alloy containing 1% zirconium, balance copper, during aging. It will be noted that the hardness increased from 10 Rockwell B to 59 Rockwell B in 8 hours aging at 450° C.

The conductivity of the alloy is also increased by the above heat treatment. Curve 11 in Figure 1, for example, represents the increase in conductivity of the 1% zirconium alloy with aging. It was raised from less than 50% before aging to about 74% after 8 hours aging.

If desired the alloy may be cold worked after the heat treatment has been completed and it has been found that the hardness is increased and the conductivity is not materially reduced by this treatment. Curve 12 in Figure 2 represents the increase in hardness with cold working of the above material. It will be noted that the hardness is increased from 50 Rockwell B to 75 Rockwell B during a 50% reduction in thickness.

The resulting heat treated electrodes have comparatively high strength at the elevated temperatures which are encountered in the welding operation and are not softened by extended use at these temperatures. Curve 13 in Figure 3 shows that a heat treated and cold worked electrode material containing 1% zirconium and the balance copper will retain a hardness of above 60 Rockwell B after being heated for 2 hours at 450° C. or 500° C.

The electrodes are also extremely resistant to mushrooming and wear. This is clearly shown in Figures 4 and 5 which represent the increase in tip area (mushrooming) of welding electrodes of pure copper and of 1% zirconium, balance copper, under two different operating conditions. Figure 4 shows the effect on the electrodes when constant force is applied to the entire electrode and Figure 5 shows the effect when the force is increased in such a manner as to keep the pressure per unit area constant.

As indicated in Figure 4 electrodes of pure copper mushroomed with an increase in tip area of 300% during 2000 spot welds (curve 15) while electrodes containing 1% zirconium increased in tip area only 80% (curve 14). Additions of small amounts of other ingredients, such as cadmium, may further reduce the tendency to mushroom.

Figure 5 shows the comparative mushrooming of electrodes of pure copper and the above copper-zirconium alloy when the pressure per unit area is held constant. It will be noted that with 1000 spot welds the area of the copper electrode increased over 400% while the copper-zirconium electrode increased in area less than 50%.

While the present invention, as to its objects and advantages, has been described herein as carried out in specific embodiments thereof, it is not desired to be limited thereby but it is intended to cover the invention broadly within the spirit and scope of the appended claim.

What is claimed is:

A welding electrode formed of an alloy containing about 0.1% to 5% zirconium and the balance copper.

FRANZ R. HENSEL.
EARL I. LARSEN.